United States Patent
Ye et al.

(10) Patent No.: US 10,199,947 B2
(45) Date of Patent: Feb. 5, 2019

(54) ISOLATED PARTIAL POWER PROCESSING POWER CONVERTERS

(71) Applicant: Futurewei Technologies, Inc., Plano, TX (US)

(72) Inventors: Liming Ye, Frisco, TX (US); Heping Dai, Plano, TX (US); Dianbo Fu, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 23 days.

(21) Appl. No.: 15/479,885

(22) Filed: Apr. 5, 2017

(65) Prior Publication Data

US 2018/0294732 A1    Oct. 11, 2018

(51) Int. Cl.
*H02M 3/335*    (2006.01)

(52) U.S. Cl.
CPC ............................... *H02M 3/33546* (2013.01)

(58) Field of Classification Search
CPC ........... H02M 3/33523; H02M 3/3353; H02M 3/33576; H02M 3/33592
See application file for complete search history.

(56) References Cited

U.S. PATENT DOCUMENTS

| | | | | |
|---|---|---|---|---|
| 8,149,599 | B2 * | 4/2012 | Coccia | H02M 3/3376 363/21.02 |
| 8,842,448 | B2 * | 9/2014 | Ye | H02M 3/33569 363/21.02 |
| 9,337,743 | B2 * | 5/2016 | Dai | H02M 3/3353 |
| 9,584,034 | B2 * | 2/2017 | Deboy | H02M 3/33592 |
| 9,812,974 | B2 * | 11/2017 | Imai | H02M 3/33546 |
| 2008/0298093 | A1 * | 12/2008 | Jin | H02M 3/285 363/21.06 |
| 2012/0275197 | A1 * | 11/2012 | Yan | H02M 3/33592 363/21.02 |
| 2016/0149501 | A1 | 5/2016 | Dai et al. | |
| 2017/0366099 | A1 * | 12/2017 | Li | H02M 7/1623 |

* cited by examiner

*Primary Examiner* — Kyle J Moody
(74) *Attorney, Agent, or Firm* — Schwegman Lundberg & Woessner, P.A.

(57) ABSTRACT

In an Input-Series-Output-Parallel (ISOP)-type power converter circuit, a DC-to-DC converter has a positive input coupled to a DC power source and a negative input connected to a negative output. A plurality of capacitors are coupled in series between a positive output of the converter and a circuit ground, the negative output of the converter coupled to a common node of first and second capacitors. A half-bridge inverter network is coupled between the positive output and a circuit ground, each inverter having an input respectively coupled to the first capacitor and the second capacitor. A plurality of resonant tanks are coupled to an output of a respective one of first and second half-bridge inverters. A transformer is coupled to outputs of the plurality of resonant tanks. A rectifier circuit is coupled to a secondary winding of the transformer to provide a DC output voltage.

20 Claims, 17 Drawing Sheets

ISOLATED PARTIAL POWER PROCESSING POWER CONVERTERS

FIELD OF THE INVENTION

The present disclosure is related to power supplies, and in particular to power converters in power supplies.

BACKGROUND

Power converters have been used in power supplies for voltage and power conversions. High efficiency power converters are needed in many applications to reduce the power losses and the heat generated, shrink the size and cut the cost of the power supplies and the cooling equipments. Power converters with wider voltage regulation range generally have lower power efficiencies compared to converters with narrower voltage regulation range and unregulated converters, and vice versa, given that other aspects and conditions of the converters are comparable. Voltage regulation capability and power conversion efficiency are often two conflicting things for high efficiency power conversions.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, there is provided an Input-Series-Output-Parallel (ISOP)-type power converter circuit that includes: a non-isolated, regulated DC-to-DC converter having a positive input coupled to a DC power source and a negative input connected to a negative output; a plurality of capacitors, comprising first and second capacitors, coupled in series between a positive output of the converter and a circuit ground, the negative output of the converter coupled to a common node of the first and second capacitors; a half-bridge inverter network comprising first and second half-bridge inverters coupled between the positive output and the circuit ground, each inverter having an input respectively coupled to the first capacitor and the second capacitor; a plurality of resonant tanks, each resonant tank coupled to an output of a respective one of the first and second half-bridge inverters; a transformer having at least one primary winding coupled to outputs of the plurality of resonant tanks; and a rectifier circuit, coupled to a secondary winding of the transformer, to provide a DC output voltage.

Optionally, in any of the preceding aspects, another implementation of the aspect provides that the plurality of resonant tanks comprise a first resonant tank circuit coupled between the first half bridge inverter and the transformer and a second resonant tank circuit coupled between the second half bridge inverter and the transformer.

Optionally, in any of the preceding aspects, another implementation of the aspect provides that the ISOP-type power converter further includes a third resonant tank circuit coupled between the half-bridge inverter network and the transformer.

Optionally, in any of the preceding aspects, another implementation of the aspect provides that the transformer comprises one primary winding and the first and second resonant tank circuits each comprise a respective capacitor and inductor coupled in series wherein each resonant tank is coupled to the respective first and second half-bridge inverter and the primary winding.

Optionally, in any of the preceding aspects, another implementation of the aspect provides that the transformer comprises a first and a second primary winding and the first and second resonant tank circuits each comprise a respective capacitor and inductor coupled in series wherein each capacitor is coupled to the respective first and second half-bridge inverter, the inductor of the first resonant tank circuit is coupled to the first primary winding and the inductor of the second resonant tank circuit is coupled to the first and the second primary windings.

Optionally, in any of the preceding aspects, another implementation of the aspect provides that the first and second resonant tank circuits each comprise a respective capacitor and inductor coupled in series wherein the capacitor of the first resonant tank circuit is coupled to the first half-bridge inverter and the first inductor is coupled to the transformer and the capacitor of the second resonant tank circuit is coupled to the negative output of the DC-to-DC converter and the inductor of the second resonant tank circuit is coupled to the transformer.

Optionally, in any of the preceding aspects, another implementation of the aspect provides that the first and second resonant tank circuits each comprise a respective capacitor and inductor coupled in series wherein the capacitor of the first resonant tank circuit is coupled to the negative output of the DC-to-DC converter and the inductor of the first resonant tank is coupled to the transformer and the capacitor of the second resonant tank circuit is coupled to the second half-bridge inverter and the inductor of the second resonant tank circuit is coupled to the transformer.

Optionally, in any of the preceding aspects, another implementation of the aspect provides that the first half-bridge inverter is coupled between the positive output of the DC-to-DC converter and the circuit ground and the second half-bridge inverter is coupled between the negative output of the DC-to-DC converter and the circuit ground, further wherein the first resonant tank circuit is coupled between the first half-bridge inverter and the transformer, the second resonant tank circuit is coupled between the second half-bridge inverter and the transformer, and the circuit ground is coupled to the transformer.

Optionally, in any of the preceding aspects, another implementation of the aspect provides that the transformer comprises first and second primary windings and the second resonant tank circuit is coupled to both the first and second primary windings, the first resonant tank circuit is coupled to the first primary winding, and the circuit ground is coupled to the second primary winding.

Optionally, in any of the preceding aspects, another implementation of the aspect provides that the third resonant tank circuit is coupled between the negative output of the DC-to-DC converter and the transformer.

Optionally, in any of the preceding aspects, another implementation of the aspect provides that the rectifier circuit comprises a full-bridge rectifier coupled to the secondary winding of the transformer.

Optionally, in any of the preceding aspects, another implementation of the aspect provides that the rectifier circuit comprises a center-tapped full-wave rectifier coupled to first and second secondary windings of the transformer.

Optionally, in any of the preceding aspects, another implementation of the aspect provides that the rectifier circuit comprises a three-level half-bridge rectifier coupled to the secondary winding of the transformer.

Optionally, in any of the preceding aspects, another implementation of the aspect provides that the non-isolated, DC-to-DC converter is one of a buck converter, a boost converter, a buck-boost converter, or any non-inverting DC-DC converter.

According to one aspect of the present disclosure, there is provided an Input-Parallel-Output-Series (IPOS)-type power converter circuit that includes: an inverter circuit coupled to a DC power source to generate an AC voltage; a transformer having a primary winding coupled to an inverter output; a resonant tank network coupled to secondary windings of the transformer; a half-bridge rectifier network, comprising first and second half bridges coupled in series, coupled to the resonant tank network; a capacitor network comprising first and second capacitors coupled in series, the capacitor network coupled to an output of the half-bridge rectifier network and a common circuit node; and a non-isolated, regulated DC-to-DC converter to provide an output voltage, the converter comprising a positive input and a negative input respectively coupled to opposite ends of the first capacitor and the first half bridge rectifier, wherein a positive output is coupled to the output voltage, further wherein a negative output of the converter is connected to a common node of the negative input, the second capacitor, the first capacitor, and the half-bridge rectifier network.

Optionally, in any of the preceding aspects, another implementation of the aspect provides that the inverter circuit comprises one of a full-bridge inverter or a half-bridge inverter.

According to one aspect of the present disclosure, there is provided a method for operation of an Input-Series-Output-Parallel (ISOP)-type power converter circuit, the method including: generating a DC power supply voltage; generating regulated DC voltages from the power supply voltage with a non-isolated, DC-to-DC converter having a negative input connected to a negative output; converting the regulated DC voltages to first AC voltages with half-bridge inverters; filtering the first AC voltages with a resonant tank network to generate filtered AC voltages; generating second AC voltages, from the filtered AC voltages, through a transformer; and generating a DC output voltage from the second AC voltages.

Optionally, in any of the preceding aspects, another implementation of the aspect provides that filtering the first AC voltages comprises filtering the first AC voltages with three resonant tank circuits.

According to one aspect of the present disclosure, there is provided a method for operation of an Input-Parallel-Output-Series (IPOS)-type power converter circuit, the method including: generating a DC power supply voltage; generating a primary AC voltage from the power supply voltage to be coupled to a primary winding of a transformer; generating a plurality of secondary AC voltages from secondary windings of the transformer; filtering the plurality of secondary AC voltages to generate a plurality of filtered AC voltages; converting the plurality of filtered AC voltages to a plurality of DC voltages with half-bridge inverters; and converting the plurality of DC voltages to an output voltage from a positive output of an isolated, regulated DC-to-DC converter having a negative input connected to a negative output.

Optionally, in any of the preceding aspects, another implementation of the aspect provides that generating the plurality of secondary AC voltages comprises generating the plurality of secondary AC voltages from a plurality of secondary windings of the transformer.

Any one of the foregoing examples may be combined with any one or more of the other foregoing examples to create a new embodiment within the scope of the present disclosure.

DETAILED DESCRIPTION

Figure 1:
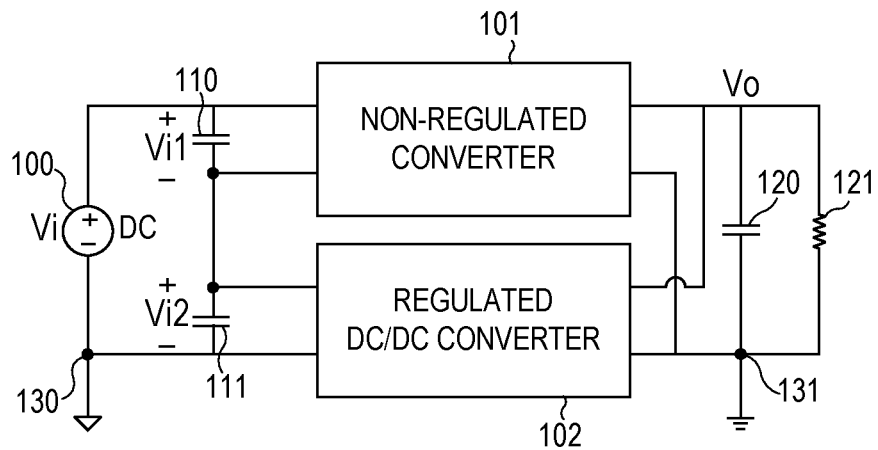
FIG. 1 is a block diagram of a typical prior art Input Series Output Parallel (ISOP)-type partial power processing converter.

Partial power processing converter circuits, such as IPOS and ISOP types of power converters, are used in power supplies to convert one DC voltage to another DC voltage. By providing voltage regulation capability just as needed and as appropriate for a targeted application, one can eventually improve the overall efficiency of the whole power converter.

Using partial power processing approaches, some portions of the total power are processed through very high efficiency power processing paths with a direct power path without active power processing (e.g., power processing that involves active switching actions), or with minimum amount of active power processing effort, such as unregulated power converters, to achieve the best efficiency for these portions of power. In the meantime, the rest of the power is processed with regulated power conversion circuits to achieve desired voltage regulation capability for the whole converter. Partial power processing circuits can boost efficiency since part of the input power is processed with a minimum amount of active power processing.

A partial power processing converter generally exhibits narrower voltage regulation range but better power conversion efficiency compared to the regulated power conversion circuits of which the whole converter is consists. In other words, partial power processing methods provide some extra degrees of freedom to optimize the overall converter design and achieve the best results.

Partial power processing is a methodology that is able to achieve substantially better balance between voltage regulation capability and power conversion efficiency. ISOP and IPOS circuits are two forms of partial power processing converter circuits.

ISOP is one of the architectures to implement partial power processing. A converter of ISOP type is constructed with a plural of sub-converters, where the input ports of the sub-converters are connected in series and their output ports are connected in parallel. When Vin=Vinmin, Vo=Vomax, ISOP type of partial power processing architecture generally produces the best efficiency, since the highest percentage of the total power goes through the high efficiency unregulated power conversion path, and the lowest percentage of the total power goes through the low efficiency regulated power conversion path. However, when Vin=Vinmax and Vo=Vomin, the overall efficiency is the lowest, since the lowest percentage of the total power goes through the high efficiency unregulated power path and the highest percentage of the total power goes through the low efficiency regulated power conversion path.

IPOS is another architecture to implement partial power processing. A converter of IPOS type is constructed with a plural of sub-converters, where the input ports of the sub-converters are connected in parallel and their output ports are connected in series. The efficiency characteristics of IPOS are opposite to that of ISOP. When Vin=Vinmin, Vo=Vomax, IPOS gives lowest efficiency in general since the lowest percentage of the total power goes through the high efficiency unregulated power path. While for Vin=Vinmax and Vo=Vomin, the overall efficiency is the highest since the highest percentage of the total power goes through the high efficiency unregulated power path.

There is also an ISOS (Input Series Output Series) architecture where the input ports of the sub-converters are connected in series and the output ports are connected in series as well. However, since the input currents and output currents of all the sub-converters are forced equal due to series connection, ISOS architecture demands the DC voltage gains of the sub-converter modules be substantially equal to each other. Therefore, an ISOS structure is not quite suitable for partial power processing because unregulated converters and regulated converters cannot have the same DC voltage gain.

The ISOP circuit is relatively efficient when the input voltage is at the minimum voltage of the input voltage range and the output voltage is at the maximum voltage of the output voltage range. In this scenario, the highest percentage of total power goes through a relatively high efficiency unregulated power path of the circuit. However, when the input voltage is at the maximum voltage of the input voltage range and the output voltage is at minimum voltage of the output voltage range, the overall efficiency of the ISOP is not as good since the lowest percentage of total power goes through the unregulated power path of the circuit.

The efficiencies of the IPOS circuit are opposite to that of the ISOP circuit. The IPOS circuit has its lowest efficiency when the input voltage is at the minimum voltage of the input voltage range and the output voltage is at the maximum voltage of the output voltage range. In this scenario, the lowest percentage of power goes through the high efficiency unregulated power path. When the input voltage is at the maximum voltage of the input voltage range and the output voltage is at the minimum voltage of the output voltage range, the overall efficiency is best since the highest percentage of total power goes through the high efficiency unregulated power path.

As the size of a conventional power converter circuit is reduced, its power loss and heat generation increases. This is due to the increased resistance of the smaller size circuit as compared to a larger circuit. Conversely, larger power converter circuits have reduced resistances and, thus, generate less heat and power loss. It is desirable to have both a smaller size power processing converter circuit as well as increased efficiency and reduced power loss.

The disclosed embodiments include novel high efficiency ISOP-type isolated partial power processing converters and novel high efficiency IPOS-type isolated partial power processing converters. These circuits provide relatively higher efficiency and relatively lower power loss over a wide input and output voltage range in a reduced size circuit compared to prior art partial power processing converters.

FIG. 1 is a block diagram of a typical prior art Input Series Output Parallel (ISOP)-type partial power processing converter. The ISOP-type partial power processing converter includes a non-regulated converter 101 and a regulated DC-to-DC converter 102.

A DC power supply 100 is coupled between an input of the non-regulated converter 101 and the regulated converter 102. The Vi− node of the power supply 100 is coupled to ground 130. A respective capacitor 110, 111 is also coupled in parallel between the inputs of non-regulated converter 101 and the regulated converter 102. These capacitors 110, 111 provide voltages Vi1 and Vi2 to their respective converters.

A load is represented by a capacitor 120 and a resistor 121 coupled between an output of the non-regulated converter 101 and an output of the regulated DC-to-DC converter 102. The other output of the non-regulated converter 101 is coupled to ground 131 while the other output of the regulated converter 102 is coupled to the Vo output of the non-regulated converter 101.

Figure 2:
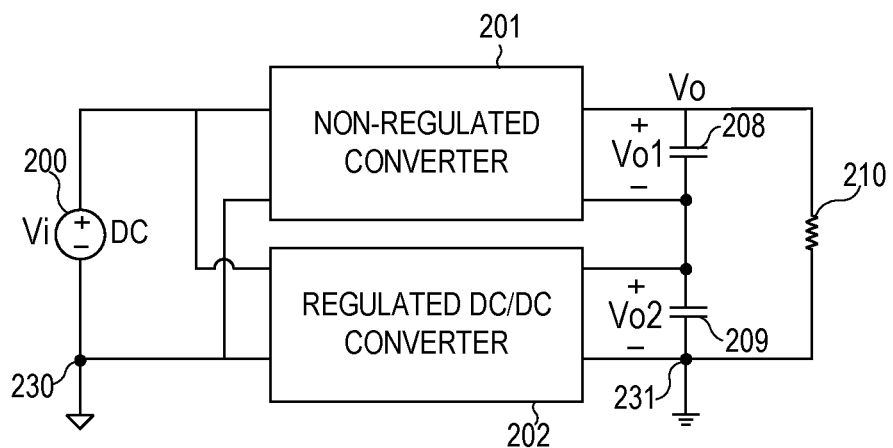
FIG. 2 is a block diagram of a typical prior art Input Parallel Output Series (IPOS)-type partial power processing converter.

FIG. 2 is a block diagram of a typical prior art Input Parallel Output Series (IPOS)-type partial power processing converter. The IPOS-type partial power processing converter includes a non-regulated converter 201 and a regulated DC-to-DC converter 202.

A DC power supply 200 (e.g., Vi+ node) is coupled between a first input of the non-regulated converter 201 and a first input of the regulated converter 202. The second input of the non-regulated converter 201 is coupled to ground (e.g., Vi− node) 230 with the first input of the regulated converter 202. The second input of the regulated converter 202 is coupled to the Vi+ node.

A circuit load is represented by a resistor 210 and a pair of capacitors 208, 209 that are each coupled in parallel between respective outputs of the non-regulated converter 201 and the regulated converter 202. Output voltages Vo1 and Vo2 are output from the respective converter 201, 201 across their respective capacitor 208, 209 referenced to ground 231.

Figure 3:
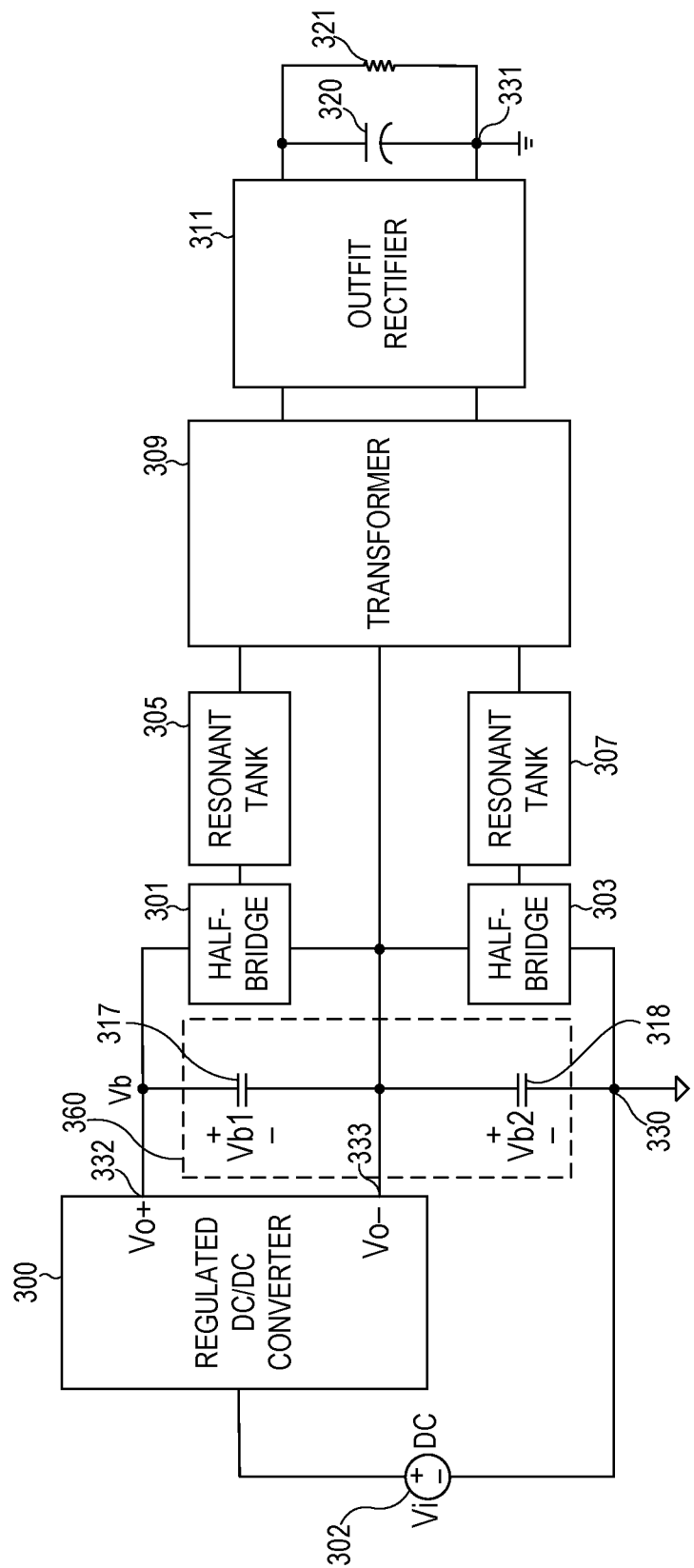
FIG. 3 is a block diagram of an ISOP-type partial power processing converter circuit, according to an example embodiment.

FIG. 3 is a block diagram of an ISOP-type partial power processing converter circuit, according to an example embodiment. The circuit includes a DC power supply 302 coupled between a positive input of the non-isolated, regulated DC-to-DC converter 300 and a circuit ground 330. A capacitor network 360 comprises first and second capacitors 317, 318 coupled in series between a positive output node 332 of the converter 300 and the circuit ground 330. The first capacitor 317 is coupled between the positive output node 332 and the negative output node 333 of the converter circuit 300. The second capacitor 318 is coupled between the circuit ground 330 and the negative output node 333 of the converter 300. The capacitor network 360 provides DC filtering of the converter output voltage prior to being converted to AC voltages.

A half-bridge inverter network, comprising first and second half-bridge inverters 301, 303, is coupled between the positive and negative output nodes 332, 333 and the circuit ground 330. For example, the first half-bridge inverter 301 is coupled between the positive output node 332 and the negative output node 333. The second half-bridge inverter 303 is coupled between the negative output node 333 and the circuit ground 330

A first resonant tank 305 is coupled to an output of the first half-bridge inverter 301 and a second resonant tank 307 is coupled to an output of the second half-bridge inverter 307. The first and second resonant tanks 305, 307 each form an LLC type of resonant converter or other resonant type of converter.

A transformer 309 is coupled to the resonant tanks 305, 307. One connection of the primary winding of the transformer 309 is coupled to an output of the first resonant tank circuit 305. A second connection of the primary winding of the transformer 309 is coupled to an output of the second resonant tank circuit 307. A third connection of the primary winding of the transformer 309 is coupled to the common node of the half-bridge inverters 301 and 303, which is also the negative output node 333 of the converter circuit 300.

An output rectifier 311 is coupled to the secondary windings of the transformer 309 to generate the output voltages. The output rectifier 311 may be a full bridge rectifier, a half-bridge rectifier, a center-tapped full-wave rectifier, or a three-level half-bridge rectifier.

An output load is coupled to the output of the output rectifier 311. The output load is represented in FIG. 3 as a capacitor 320 and a resistor 321 coupled between outputs of the output rectifier 311 and ground 331. Operation of this circuit is illustrated subsequently with reference to the block diagram of FIG. 5.

Figure 4A:
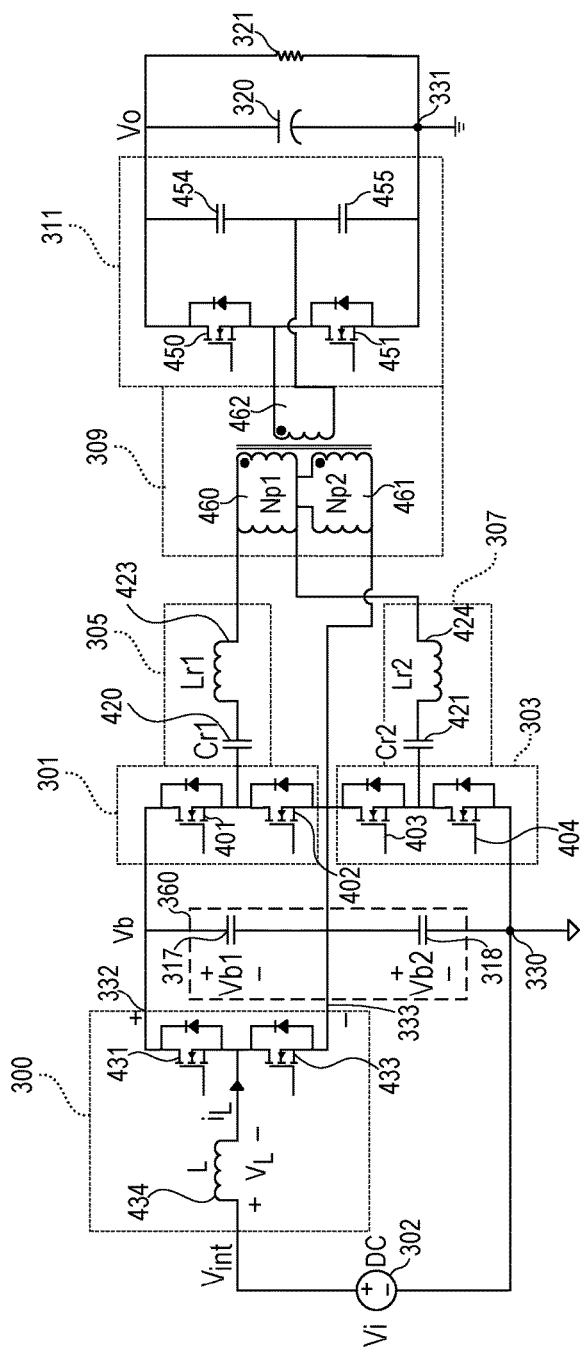
FIG. 4A is a circuit schematic of an implementation of the block diagram of FIG. 3.

FIG. 4A is a circuit schematic of an implementation of the block diagram of FIG. 3. This circuit schematic is for purposes of illustration only as other circuit components may be used to realize the block diagram of FIG. 3.

The non-isolated, regulated DC-to-DC converter 300 is implemented by a boost converter topology that includes an inductor 434 and a pair of transistors 431, 433 (e.g., N-channel MOSFET). In an embodiment, the illustrated diodes are representations of intrinsic body diodes formed by the p-n junction of the transistor.

The inductor 434 is coupled between the Vint input and the switching node of the half-bridge rectifier formed by transistors 431, 433. The drain of the top transistor 431 is the positive output node 332 of the converter circuit 300. The source of the bottom transistor 433 is the negative output node 333 of the converter circuit 300. In another embodiment, transistor 431 can replaced by a diode.

The half-bridge inverters 303, 303 may respectively be implemented by pairs of transistors 401, 402 and 403, 404. The transistors 401, 402 and 403, 404 for each respective inverter 301, 303 are coupled in series drain-to-source. In an embodiment, the illustrated diodes are representations of intrinsic body diodes formed by the p-n junction of the transistor. Operation of transistors 401-404 is illustrated in FIG. 4B.

Figure 4B:
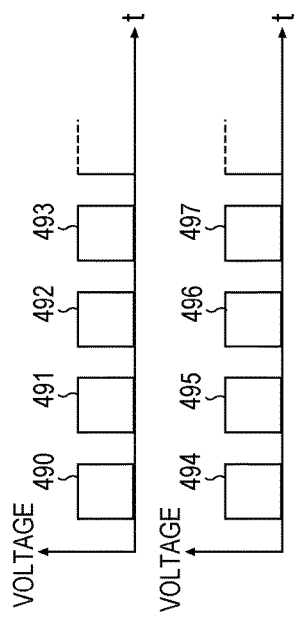
FIG. 4B shows a plot of gate drive voltages for operation of the half-bridge inverter transistors, according to the embodiment of FIG. 4A.

FIG. 4B shows a plot of gate drive voltages for operation of the half-bridge inverter transistors, according to the embodiment of FIG. 4A. Referring to FIG. 4B, pulses 490, 492 show the turn-on voltages for transistor 401. Pulses 491, 493 show the turn-on voltages for transistor 402. Pulses 494, 496 show the turn-on voltages for transistor 403. Pulses 495, 497 show the turn-on voltages for transistor 404. It can be seen that the transistors 401-404 switch at nearly 50% duty cycles. Transistors 401 and 403 switch together in phase and transistors 402 and 404 switch together in phase. Thus, transistors 401 and 402 switch 180° out of phase and transistors 403 and 404 switch 180° out of phase.

Referring again to FIG. 4A, the negative output node 333 is coupled to a common node between the transistors 401, 403 in addition to the common node between the capacitors 317, 318.

The resonant tanks 305, 307 are unregulated in this embodiment and operate in the vicinity of their resonant frequencies. The resonant tanks 305, 307 may each be implemented by a capacitor 420, 421 in series with a respective inductor 423, 424. The first capacitor 420 is coupled to the common node between transistors 401, 402 as the output of the half-bridge inverter 301. The second capacitor 421 is coupled to the common node between transistors 403, 404 as the output of the half-bridge inverter 303.

The resonant frequency of the first resonant tank circuit 305 is approximately $$Fr1 \cong \frac{1}{2\pi\sqrt{Cr1 * Lr1}}.$$

The resonant frequency of the second resonant tank circuit 307 is approximately $$Fr2 \cong \frac{1}{2\pi\sqrt{Cr2 * Lr2}}.$$

In an embodiment, the capacitances and inductances of these circuits are chosen such that Fr1=Fr2.

The transformer 309 may be implemented a two primary windings 460, 461 that are represented by Np1 and Np2, respectively. The output of the first resonant tank circuit 305 is coupled to the top-most transformer tap. The output of the second resonant tank circuit 307 is coupled to the transformer primary center tap. The bottom-most transformer tap is coupled to the negative output node 333 of the converter circuit 300, i.e., the common node between the two pairs of transistors 401, 402 and 403, 404 in addition to the common node between the capacitances 317, 318.

Figure 14:
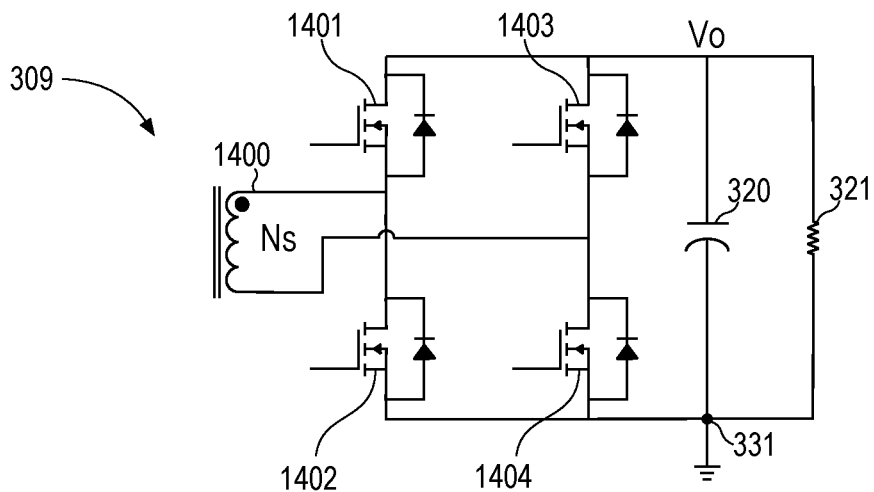
FIG. 14 is a circuit schematic of a full-bridge output rectifier for the secondary side of an ISOP type of isolated DC-to-DC converter, according to an example embodiment.

The secondary winding 462 provides the output nodes of the transformer that are coupled to a half bridge rectifier circuit 311. An implementation of a full bridge rectifier circuit 311 is illustrated in FIG. 14 and discussed subsequently. The half-bridge rectifier circuit 311 may be implemented by two series coupled transistors 450, 451 that are coupled drain-to-source. A first input of the rectifier circuit 311 is coupled to a common node between the transistors 450, 451. In an embodiment, the illustrated diodes are representations of intrinsic body diodes formed by the p-n junction of the transistor. Transistors 450, 451 can also be rectifier diodes.

A first capacitor 454 is coupled between the source of the first transistor 450 and the second input of the rectifier circuit 311. A second capacitor 455 is coupled between the common node of the first capacitor 454/second input of the rectifier circuit 311 and the drain of the second transistor 451. The drain of the first transistor 450 provides one output of the rectifier circuit 311 while the source of the second transistor 451 provides the other output of the rectifier circuit 311.

The power delivered to Vb1 is fully processed by the converter circuit 300. However, the power delivered to Vb2 actually does not need active power processing performed by the converter circuit 300, although seemingly this part of power also comes from the converter circuit 300. This portion of power flowing from the input DC source Vi 302 to Vb2 is, therefore, processed with greater efficiency as compared to the prior art.

Figure 7:
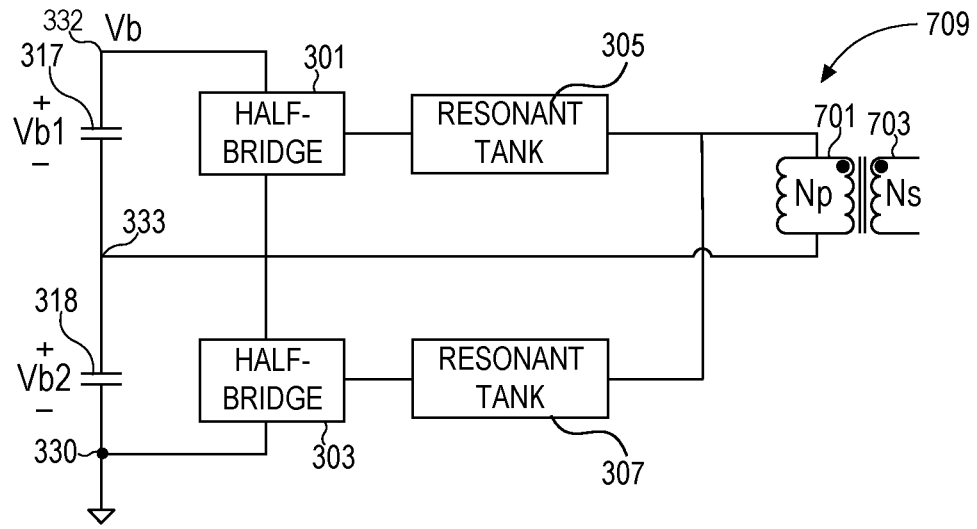
FIG. 7 is a block diagram of a resonant tank topology, according to an example embodiment.
Figure 8:
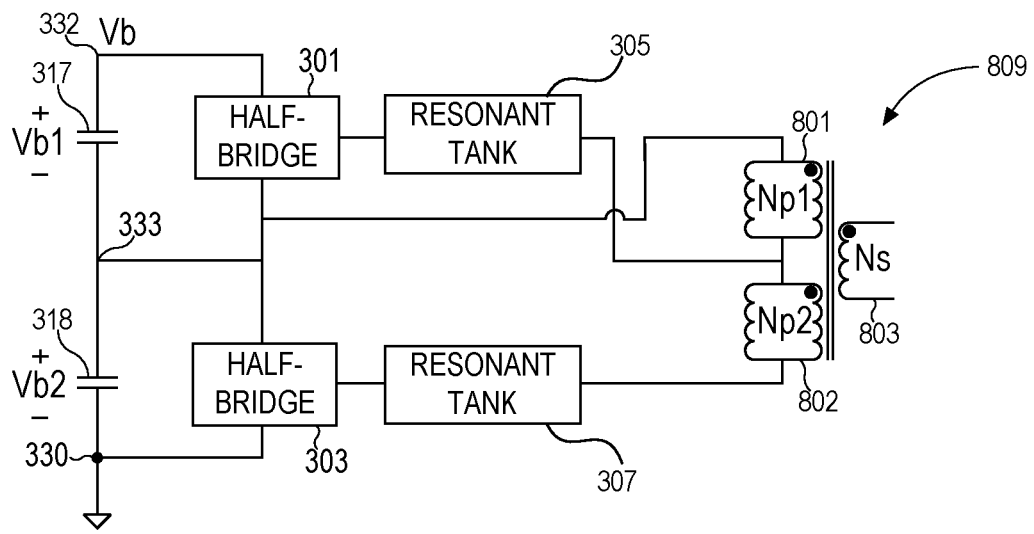
FIG. 8 is a block diagram of another resonant tank topology, according to an example embodiment.

The ratio of voltages Vb1/Vb2 determines the ratio of power delivered to the intermediate output voltages Vb1 and Vb2 by the non-isolated, regulated DC-to-DC converter circuit 300. Thus, this ratio determines the partial power processing ratio for the whole converter. The ratio of Vb1/Vb2 is determined by the turns ratio of the corresponding primary windings 460, 461 of the transformer 309. In this embodiment, Vb1/Vb2 is approximately (Np1+Np2)/Np2 such that Vb1>Vb2. By using different primary winding configurations and different number of primary turns, Vb1 may be made greater than, equal to, or less than Vb2. Example variations of this are illustrated in the embodiments of FIGS. 7 and 8 as described subsequently.

Figure 5:
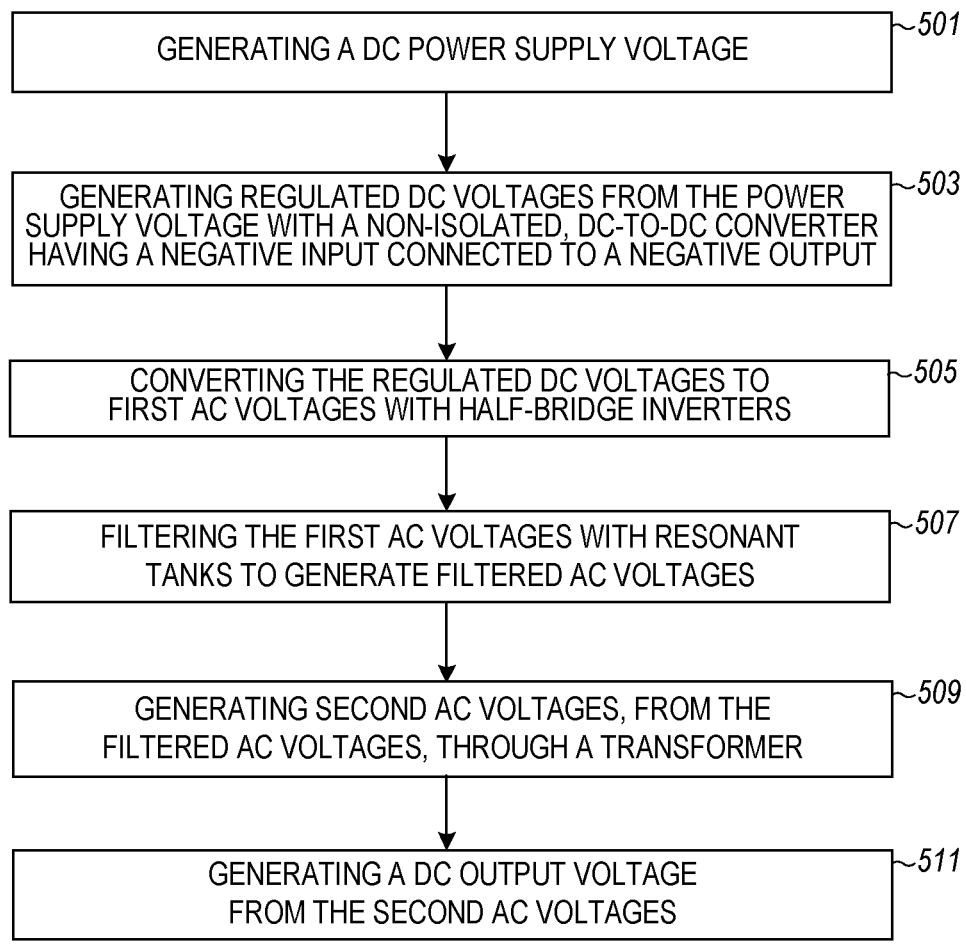
FIG. 5 is a flow diagram illustrating operation of an ISOP-type circuit, according to the embodiment of FIG. 2.

FIG. 5 is a flow diagram illustrating operation of an ISOP-type circuit, according to the embodiment of FIG. 2. In block 501, a DC power supply voltage is generated. In block 503, regulated DC voltages are generated from the power supply voltage with a non-isolated, DC-to-DC converter having a negative input connected to a negative output. In block 505, the regulated DC voltages are converted to first AC voltages with a switch network configured as half-bridge inverters. In block 507, the first AC voltages are filtered with a resonant tanks to generate filtered AC voltages. In block 509, second AC voltages are generated from the filtered AC voltages, through a transformer. In block 511, a DC output voltage is generated from the second AC voltages in a rectifier.

Figure 6:
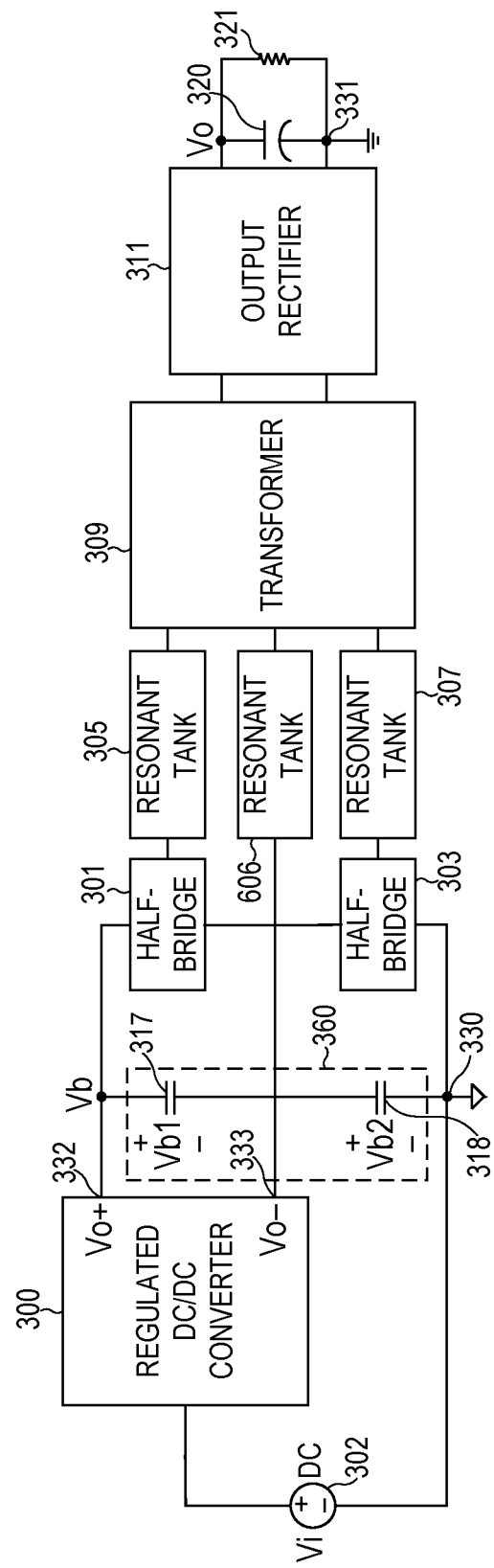
FIG. 6 is a block diagram of another ISOP-type partial power processing converter circuit, according to an example embodiment.

FIG. 6 is a block diagram of another ISOP-type partial power processing converter circuit, according to an example embodiment. This embodiment is substantially similar to that of FIG. 3 with the addition of another resonant tank circuit 606.

An input of the third resonant tank circuit 606 may be coupled to the common negative output node 333. An output of the third resonant tank circuit 606 may be coupled to one of the primary winding taps of the transformer 309 according to the primary winding configuration.

Reference may be made to FIGS. 3-5 for descriptions of the structure and operation of these circuits. Operation and implementation of the circuit of FIG. 6 is substantially the same except for the filtering provided by the third resonant tank circuit.

As previously described, the implementation of the resonant tank circuit topology illustrated in FIG. 4 is only one possible structure. FIGS. 7-13 illustrate additional possible implementations for this circuit. The components to implement the resonant tank circuits is for purposes of illustration only since any filtering circuits may be used. FIGS. 7 and 8 illustrate the various embodiments used for the primary winding configurations to vary voltages Vb1 and Vb2.

FIG. 7 is a block diagram of a resonant tank topology, according to an example embodiment. In this embodiment, the outputs of both the first resonant tank circuit 305 and the second resonant tank circuit 307 are coupled to the same primary winding 701 of the transformer 709. The common node 333 between the capacitors 317, 318 and the half-bridge inverters 301, 303 is coupled to the bottom tap of the primary winding of the transformer 709.

The primary winding 701 with Np turns is shared by both half-bridge inverters 301, 303 to improve the winding utilization and simplify the transformer winding design. In this case, only one primary winding is used and Vb1/Vb2=1. Thus, Vb1=Vb2. Secondary winding 703 is shown with Ns turns.

FIG. 8 is a block diagram of another resonant tank topology, according to an example embodiment. In this embodiment, the transformer 809 has two primary windings 801, 802 and one secondary winding 803. The first resonant tank circuit 305 uses the primary winding 801 with Np1 turns. The second resonant tank circuit 307 uses both the primary windings 801, 802 with Np1 and Np2 turns. The common node 333 between the capacitors 317, 318 and the half-bridge inverters 301, 303 is coupled to the first primary winding 801.

The transformer primary winding 801 with Np1 turns is shared by both half-bridge inverters 301, 303 to improve the winding utilization and simply the transformer winding design. In this case, Vb1/Vb2=Np1/(Np1+Np2). Thus, Vb1<Vb2.

Figure 9:
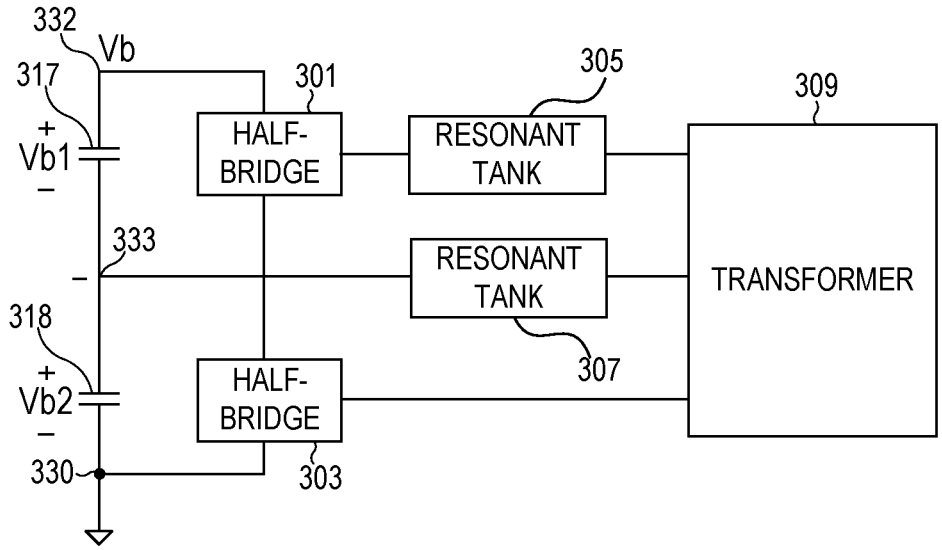
FIG. 9 is a block diagram of another resonant tank topology, according to an example embodiment.
Figure 10:
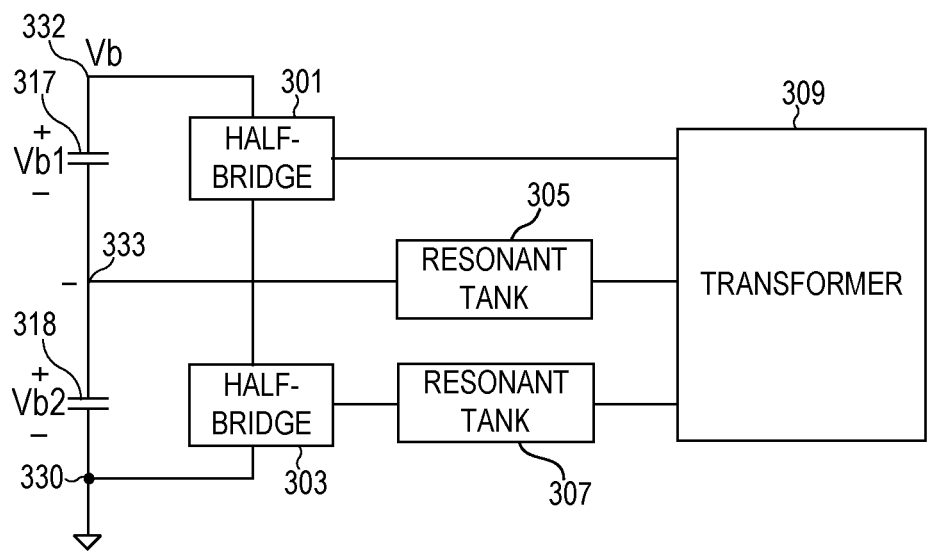
FIG. 10 is a block diagram of another resonant tank topology, according to an example embodiment.
Figure 11:
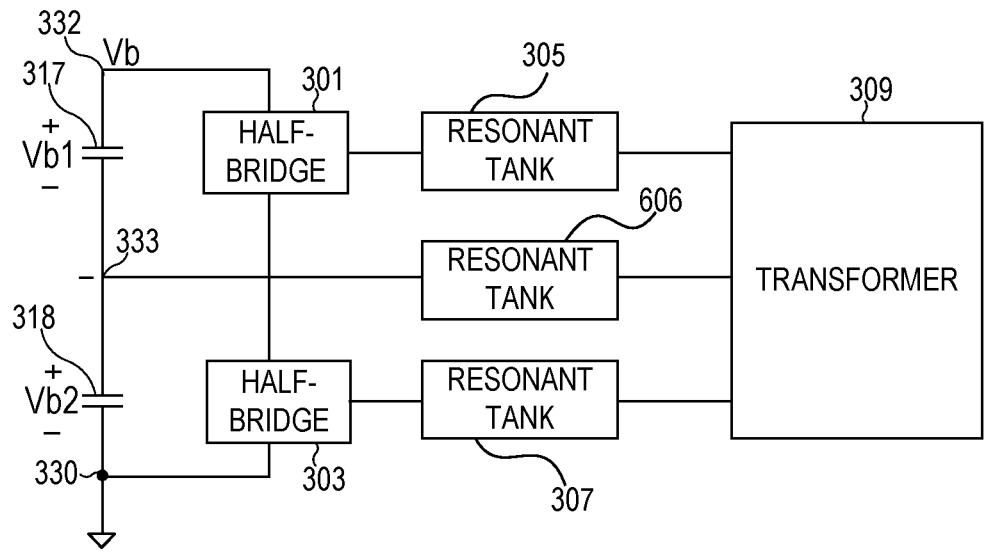
FIG. 11 is a block diagram of another resonant tank topology, according to an example embodiment.

The resonant tank circuits 305, 307 may be located in any two branches or all three branches of the inverter/transformer connection. FIGS. 9-11 show these various embodiments.

FIG. 9 is a block diagram of another resonant tank topology, according to an example embodiment. In this embodiment, the first resonant tank circuit 305 is coupled between the first half-bridge inverter 301 and the transformer 309. The second resonant tank circuit 307 is coupled between the common node 333 and the transformer 309. The second half-bridge inverter 303 is coupled to the transformer 309 without any filtering by a resonant tank circuit.

FIG. 10 is a block diagram of another resonant tank topology, according to an example embodiment. In this embodiment, the first resonant tank circuit 305 is coupled between the common node 333 and the transformer 309. The second resonant tank circuit 307 is coupled between the second half-bridge inverter 303 and the transformer 309. The first half-bridge inverter 301 is coupled directly to the transformer 309 without any filtering by a resonant tank circuit.

FIG. 11 is a block diagram of another resonant tank topology, according to an example embodiment. In this embodiment, the first resonant tank circuit 305 is coupled between the first half-bridge inverter 301 and the transformer. The second resonant tank circuit 307 is coupled between the second half-bridge inverter 303 and the transformer 309. The third resonant tank circuit 606, as illustrated in FIG. 6, is coupled between the common node 333 and the transformer 309.

Figure 12:
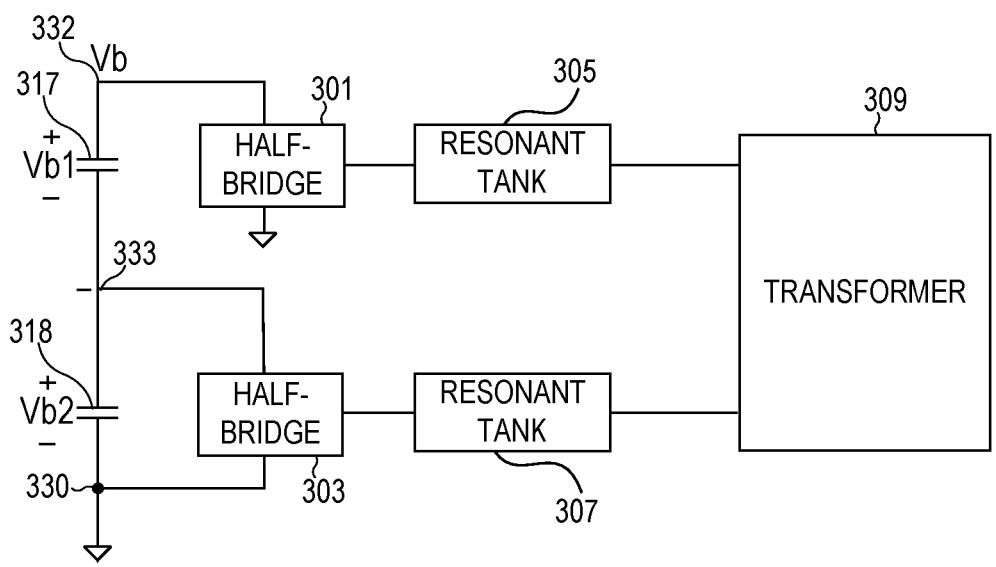
FIG. 12 is a block diagram of another resonant tank topology with half-bridge variation, according to an example embodiment.
Figure 13:
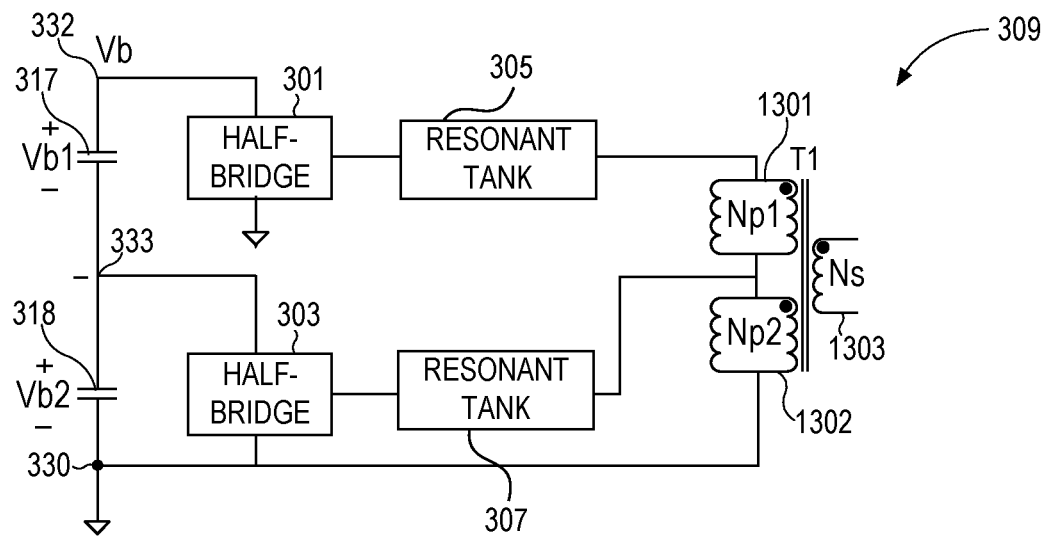
FIG. 13 is a circuit schematic of an implementation of the resonant tank topology of FIG. 12.

FIGS. 12 and 13 show yet another variation of resonant tank topology variation. FIG. 12 shows a block diagram of a variation of the connections of the half-bridge inverters 301, 303 to the resonant tank network while FIG. 13 shows one implementation of that scheme.

FIG. 12 is a block diagram of another resonant tank topology with half-bridge variation, according to an example embodiment. In this embodiment, one half-bridge inverter 303 is connected from Vb2 to ground while the other inverter 301 is connected from Vb to ground 330.

In this embodiment, the first resonant tank circuit 305 is coupled between the first half-bridge inverter 301 and the transformer 309. The first half-bridge inverter 301 is also coupled to the common circuit node (e.g., primary circuit ground) instead of the common node 333. The second resonant tank circuit 307 is coupled between the second half-bridge inverter 303 and the transformer 309.

FIG. 13 is a circuit schematic of an implementation of the resonant tank topology of FIG. 12. This circuit is for purposes of illustration only of one implementation of the circuit of FIG. 12. This figure shows that the transformer primary winding with Np2 turns may be shared by both resonant tanks 305, 307. In such an embodiment, Vb1/Vb2=Np1/Np2.

In this embodiment, the transformer 309 has two primary windings 1301, 1302 and one secondary winding 1303 with Ns turns. The first resonant tank 305 is coupled to the first primary winding 1301. The second resonant tank 307 is coupled to the center tap of the primary windings 1301, 1302. Ground 330 is coupled to the second primary winding 1302. The common node 333 is coupled to the second half-bridge inverter 303 while the first half-bridge inverter 301 is coupled to ground 330 instead of the common node 333.

Figure 15:
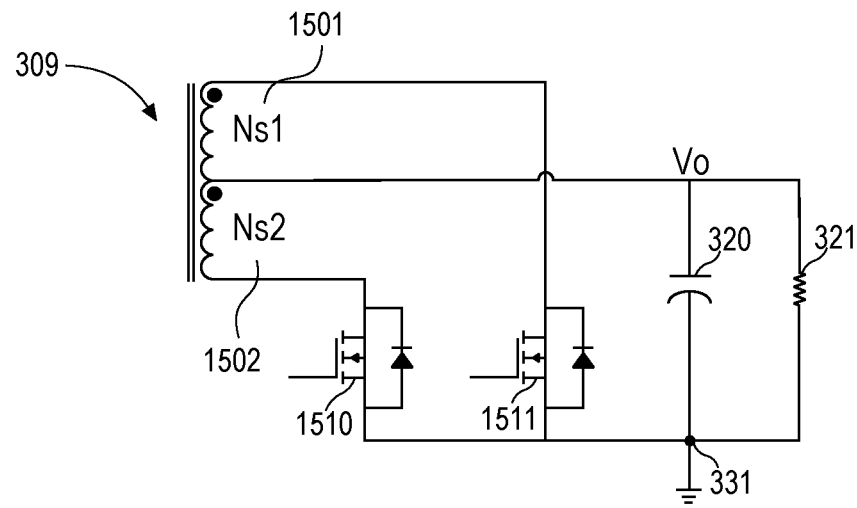
FIG. 15 is a circuit schematic of a center-tapped output rectifier for the secondary side, according to an example embodiment.
Figure 16:
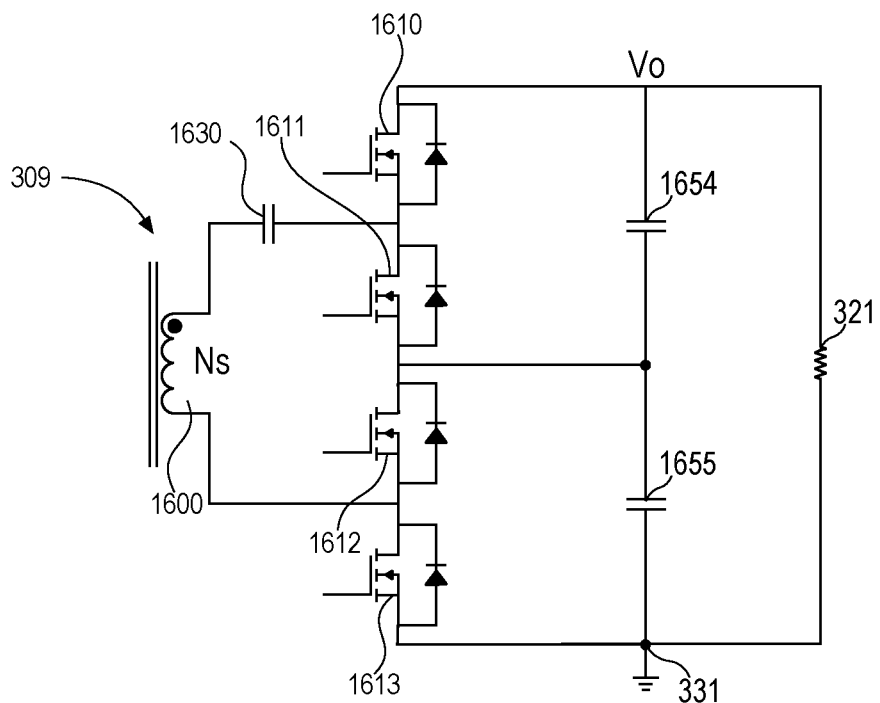
FIG. 16 is a circuit schematic of a three-level half-bridge output rectifier on the isolated converter secondary side, according to an example embodiment.

As previously described, the half-bridge implementation of the isolated DC-to-DC converter topology illustrated in FIG. 4A is only one possible structure. The output rectifier on the secondary side may also be full bridge, center-tapped, three-level or multi-level full bridge/half bridge topologies. FIGS. 14-16 illustrate only some of these implementations for this circuit.

FIG. 14 is a circuit schematic of a full-bridge output rectifier on the isolated converter secondary side, according to an example embodiment. In this embodiment, a first series pair of transistors 1401, 1042 is coupled to one tap of the secondary winding 1400 of the transformer 309 and a second series pair of transistors 1403, 1404 is coupled to a second tap of the secondary winding 1400 of the transformer 309. The load is represented by the capacitor 320 and the resistor 321. Transistors 1401-1404 may also be replaced with diodes.

FIG. 15 is a circuit schematic of a center-tapped output rectifier on isolated converter secondary side, according to an example embodiment. In this embodiment, the transformer 309 includes two secondary windings 1501, 1502. One transistor 1511 is coupled to the top winding 1501 with Ns1 turns. Another transistor 1510 is coupled to the bottom winding 1502 with Ns2 turns. The center tap provides the output voltage Vo to the load represented by the capacitor 320 and the resistor 321.

FIG. 16 is a circuit schematic of a three-level half-bridge output rectifier on the isolated converter secondary side, according to an example embodiment. In this embodiment, four series coupled transistors 1610-1613 share the one secondary winding 1600 of the transformer 309. A capacitor 1630 is in series with the secondary winding 1600. The series coupled transistors 1610-1613 are coupled between output voltage Vo and ground 331. The capacitor of the output load is shown divided into capacitors 1654, 1655 and coupled between two transistors 1611, 1612 of the series coupled transistors 1610-1613. Load resistor 321 is coupled in parallel with the capacitors 1654, 1655.

Figure 17:
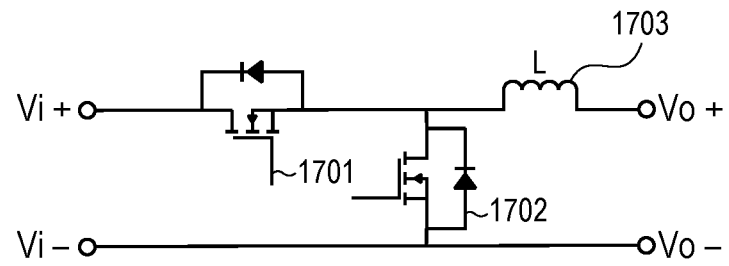
FIG. 17 is a circuit schematic of a non-isolated DC-to-DC converter in a buck converter topology, according to an example embodiment.
Figure 18:
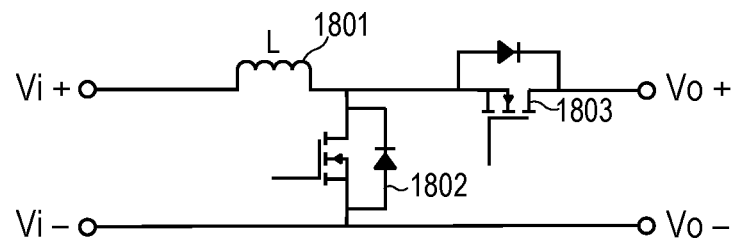
FIG. 18 is a circuit schematic of a non-isolated DC-to-DC converter in a boost converter topology, according to an example embodiment.
Figure 19:
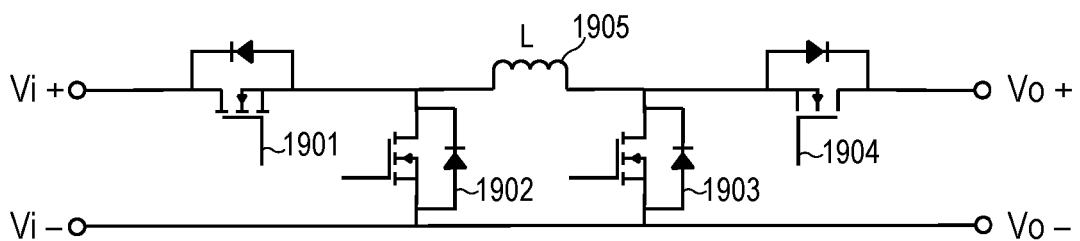
FIG. 19 is a circuit schematic of a non-isolated DC-to-DC converter in a buck-boost converter topology, according to an example embodiment.

The non-isolated DC-to-DC converter circuit 300 of FIG. 4 is shown as a boost configuration. Other configurations for this converter are also possible. For example, this converter circuit 300 may also be a buck configuration, a 4-switch buck-boost configuration, or other DC-DC converter topologies. FIGS. 17-19 illustrate just three such configurations for the non-isolated DC-to-DC converter circuit.

FIG. 17 is a circuit schematic of a non-isolated DC-to-DC converter circuit in a buck converter topology, according to an example embodiment. In this embodiment, an input transistor 1701 is coupled in series between the positive input node, Vi+, and an inductor 1703. The inductor is coupled to the positive output node, Vo+. A transistor 1702 is coupled between the common node between the input transistor 1701 and the inductor 1703 and the negative input/output nodes Vi−/Vo−. The negative input node Vi− is shorted directly to the negative output node Vo−. Transistor 1702 may be a diode.

FIG. 18 is a circuit schematic of a non-isolated DC-to-DC converter circuit in a boost converter topology, according to an example embodiment. In this embodiment, an input inductor 1801 is coupled in series between the positive input node, Vi+, and a transistor 1803. A transistor 1802 is coupled between the common node between the input inductor 1801 and the transistor 1803 and the negative input/output nodes Vi−/Vo−. The negative input node Vi− is shorted directly to the negative output node Vo−. Transistor 1803 may be a diode.

FIG. 19 is a circuit schematic of a non-isolated DC-to-DC converter circuit in a buck-boost converter topology, according to an example embodiment. In this embodiment, an input transistor 1901 is coupled in series between the positive input node, Vi+, and an inductor 1905, and a transistor 1901 is coupled between the inductor 1905 and the positive output node Vo+. A transistor 1902 is coupled between the common node between the input transistor 1901 and the inductor 1905 and the negative input/output nodes Vi−/Vo−. Another transistor 1903 is coupled between the common node between the inductor 1905 and the output transistor 1904 and the negative input/output nodes Vi−/Vo−. The negative input node Vi− is shorted directly to the negative output node Vo−. Transistor 1902 and 1904 may be a diode.

Figure 20:
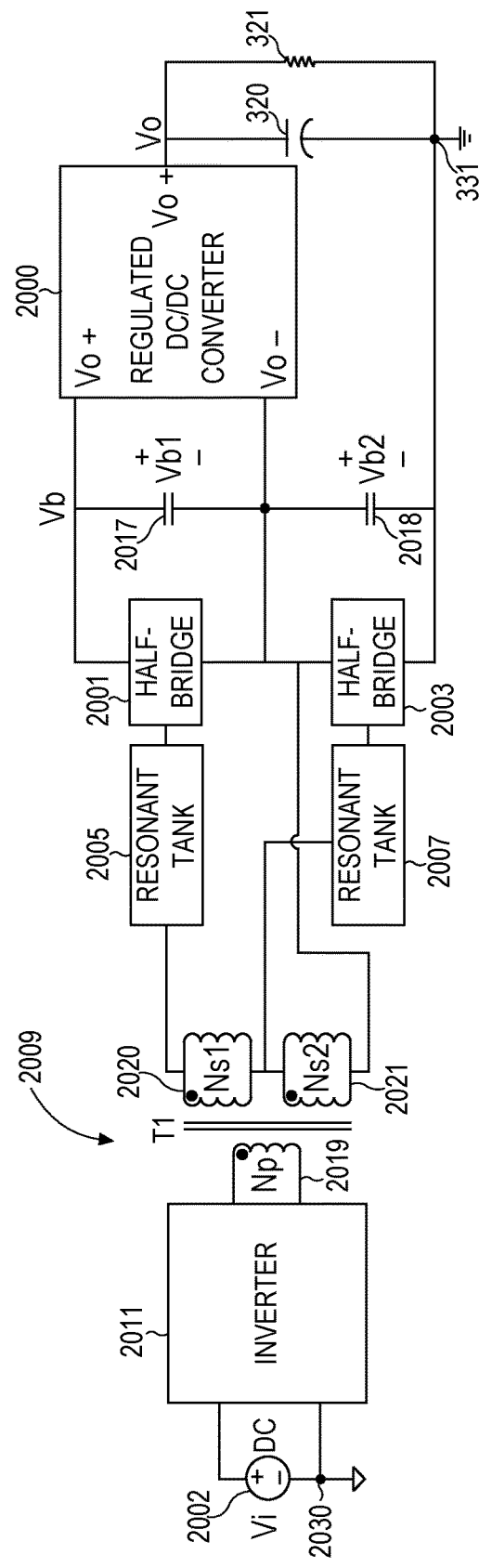
FIG. 20 is a block diagram of an IPOS-type partial power processing converter circuit, according to an example embodiment.

FIG. 20 is a block diagram of an IPOS-type partial power processing converter circuit, according to an example embodiment. The circuit includes a DC voltage power supply 2002 that provides a DC voltage Vi to the circuit with reference to ground 2030.

An inverter 2011 is coupled to the DC voltage power supply 2002 to convert the DC voltage to an AC voltage that is provided to the transformer 2009. The inverter 2011 may be a full-bridge circuit or a half-bridge circuit.

The transformer 2009 is shown having a primary winding 2019 with Np turns coupled to the inverter circuit 2011. The secondary windings 2020, 2021 have Ns1 and Ns2 turns, respectively. The secondary windings 2020, 2021 are coupled to a resonant tank network that includes resonant tank circuits 2005, 2007.

The first secondary winding 2020 is coupled to the first resonant tank 2005. The second resonant tank 2007 is coupled to the transformer center tap and share the secondary winding 2021 with the first resonant tank 2005. The secondary windings 2020, 2021 are coupled to the rectifiers 2001, 2003 through their respective resonant tanks 2005, 2007.

The output of the first resonant tank 2005 is coupled to a first half-bridge rectifier 2001. The output of the second resonant tank 2007 is coupled to a second half-bridge rectifier 2003. The half-bridge rectifiers 2001, 2003 are used to balance the voltage Vb1 and Vb2. The input power is split by the half-bridge rectifier circuits 2001, 2003 and delivered to Vb1 and Vb2 as well as fed into the non-isolated regulated DC-to-DC converter circuit 2000.

The first half-bridge rectifier circuit 2001 uses the secondary windings 2020, 2021 having turns Ns1 and Ns2 respectively. The second half-bridge rectifier circuit 2003 uses the secondary winding 2021 having turns Ns2. The transformer secondary winding 2021 is shared by both half-bridge rectifier circuits 2001, 2003 to improve the winding utilization.

An output of the first half-bridge rectifier circuit 2001 provides voltage Vb to the Vi+ input node of the non-isolated, regulated DC-to-DC converter circuit 2000. An output of the second half-bridge rectifier circuit 2003 provides the voltage to Vb2 to the Vi− input node of the converter circuit 2000.

A capacitor network comprising filter capacitors 2017, 2018 are coupled in series between the Vi+ node and ground 331. Capacitor 2017 is coupled between the input nodes Vi+ and Vi− to provide Vb1 to the converter circuit 2000. Thus, the converters positive and negative inputs are respectively coupled to opposite ends of the first capacitor 2017 and the first half-bridge rectifier 2001.

The load is coupled to the output node Vo+ of the converter circuit 2000. The load is represented by capacitor 320 and resistor 321 coupled between the output node and ground 331.

Figure 21:
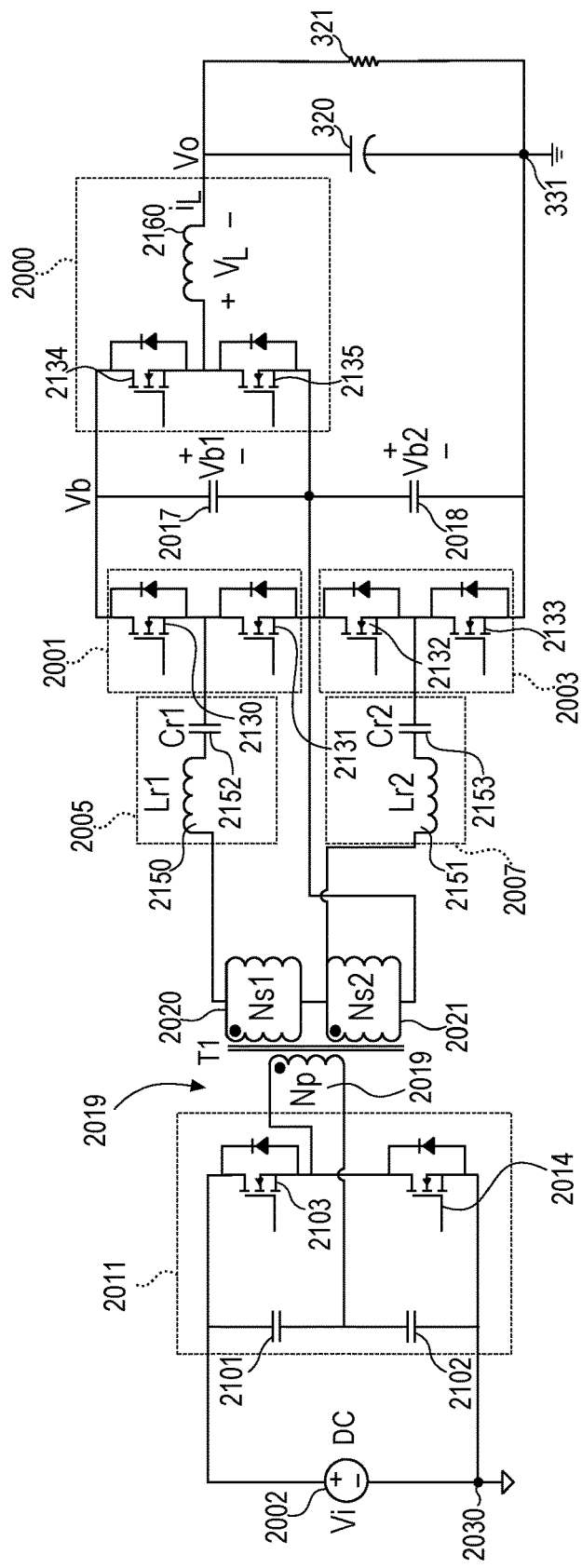
FIG. 21 is a circuit schematic of an implementation of the block diagram of FIG. 20.

FIG. 21 is a circuit schematic of an implementation of the block diagram of FIG. 20. This circuit schematic is for purposes of illustration only. Other embodiments may use the various circuits of FIGS. 7-19 for the resonant tank circuits, the DC-to-DC converter circuits, and the inverter circuits. Any combination of the above described embodiments may be used to implement the IPOS-type partial power processing converter circuit embodiment of FIG. 20.

The inverter circuit 2011 is shown implemented as a half bridge circuit comprising a series pair of capacitances 2101, 2102 coupled between the circuit inputs. A pair of transistors 2103, 2104 are coupled between the circuit inputs. In an embodiment, these transistors are N-channel MOSFET transistors. The common node between the capacitances 2101, 2012 provides one connection to the primary winding 2019 of the transformer 2009. The common node between the transistors 2103, 2104 provides another connection to the primary winding 2019 of the transformer 2009.

The resonant tank circuits 2005, 2007 are each implemented by series connections of inductors 2150, 2151 and capacitances 2152, 2153, respectively. These inductors 2150, 2151 of these circuits 2005, 2007 are shown coupled to their respective transformer secondary windings are noted previously.

The resonant frequency of the first resonant tank circuit 2005 is approximately $$Fr1 \cong \frac{1}{2\pi\sqrt{Cr1 * Lr1}}.$$

The resonant frequency of the second resonant tank circuit 2007 is approximately $$Fr2 \cong \frac{1}{2\pi\sqrt{Cr2 * Lr2}}.$$

In an embodiment, the capacitances and inductances of these circuits are chosen such that Fr1=Fr2.

The half-bridge rectifier circuits 2001, 2003 are each shown implemented by a pair of series connected transistors 2130, 2131 and 2132, 2133, respectively. In an embodiment, these transistors 2130, 2131 and 2132, 2133 are NFET transistors.

As in previous embodiments, transistors 2130-2133 switch at nearly 50% duty cycles. Transistors 2130, 2132 switch together in phase and transistors 2131, 2133 switch together in phase. Thus, transistors 2130, 2131 switch 180° out of phase and transistors 2132, 2133 switch 180° out of phase.

The DC-to-DC converter circuit 2000 is shown implemented as a buck converter using a series connected pair of transistors 2134, 2135 coupled across the inputs of the circuit 2000. In an embodiment, these transistors 2134, 2135 are NFET transistors. An output inductor 2160 is coupled between the common node between the transistors 2134, 2135 and the output node of the circuit 2000. The inductor is coupled to the output load 2015.

Figure 22:
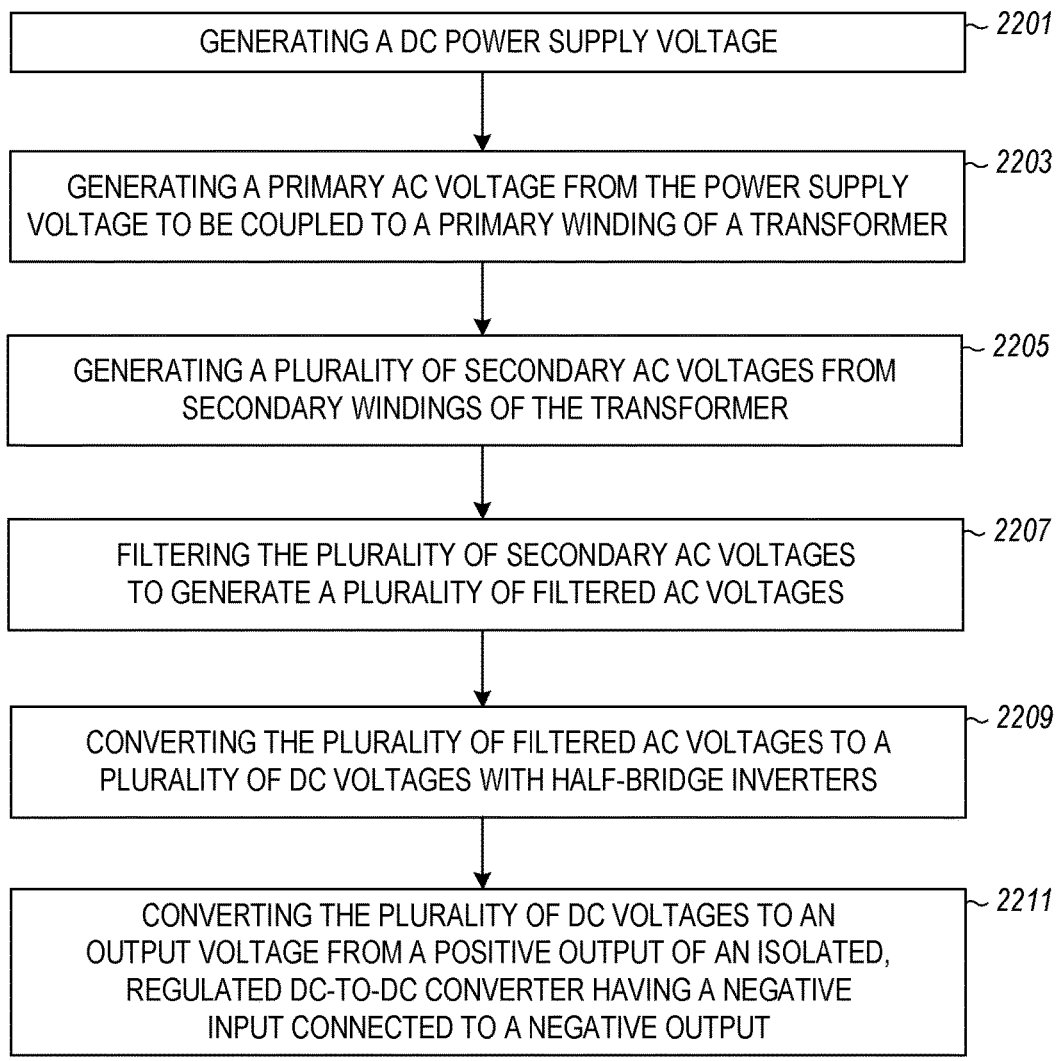
FIG. 22 is a flow diagram illustrating operation of an IPOS-type circuit, according to the embodiment of FIG. 20.

FIG. 22 is a flow diagram illustrating operation of an IPOS-type circuit, according to the embodiment of FIG. 20.

In block 2201, a DC power supply voltage is generated. In block 2203, a primary AC voltage is generated from the power supply voltage by a switch network to be coupled to a primary winding of a transformer. In block 2205, a plurality of secondary AC voltages are generated from secondary windings of the transformer. In block 2207, the plurality of secondary AC voltages are filtered to generate a plurality of filtered AC voltages. In block 2209, the plurality of filtered AC voltages are converted to a plurality of DC voltages with half-bridge inverters. In block 2211, the plurality of DC voltages are converted to an output voltage from a positive output of an isolated, regulated DC-to-DC converter having a negative input connected to a negative output.

Figure 23:
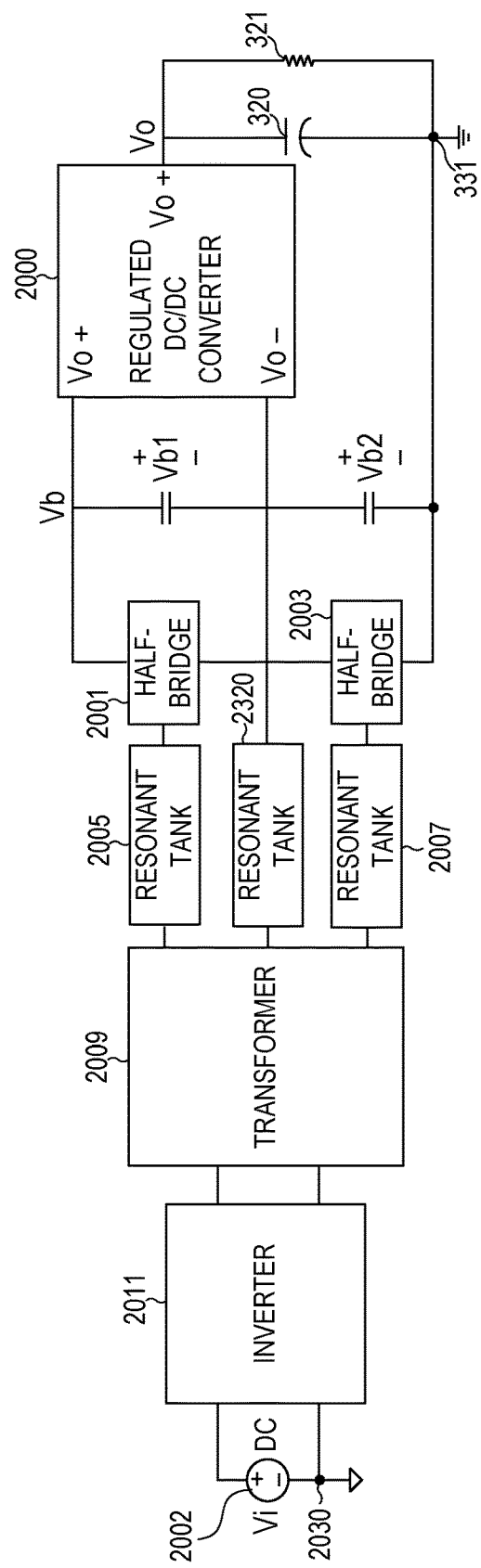
FIG. 23 is a block diagram of another IPOS-type partial power processing converter circuit, according to an example embodiment.

FIG. 23 is a block diagram of another IPOS-type partial power processing converter circuit, according to an example embodiment. This embodiment is substantially similar to that of FIG. 20 with the addition of another resonant tank circuit 2320.

An input of the third resonant tank circuit 2320 may be coupled to the center tap of the primary winding of the transformer 2009. An output of the third resonant tank circuit 2320 may be coupled to the negative input node of the converter circuit 2000.

Reference may be made to FIGS. 20-22 for descriptions of the structure and operation of these circuits. Operation and implementation of the circuit of FIG. 23 is substantially the same except for the filtering provided by the third resonant tank circuit.

The ratio of voltages Vb1/Vb2 determines the ratio of power delivered to the intermediate output voltages Vb1 and Vb2. Thus, this ratio determines the partial power processing ratio for the whole converter. The ratio of Vb1/Vb2 is determined by the turns ratio of the corresponding secondary windings 2020, 2021 of the transformer 2009. In this embodiment, Vb1/Vb2 is approximately (Ns1+Ns2)/Ns2 such that Vb1>Vb2. By using different primary winding configurations and different number of primary turns, Vb1 may be made greater than, equal to, or less than Vb2.

As in previous embodiments, the implementation of FIG. 21 is only one possible implementation of the circuit of FIG. 20. Similar to previous embodiments, FIGS. 24-26 illustrate additional possible embodiments for the inverter circuit 2011 of FIG. 20.

Figure 24:
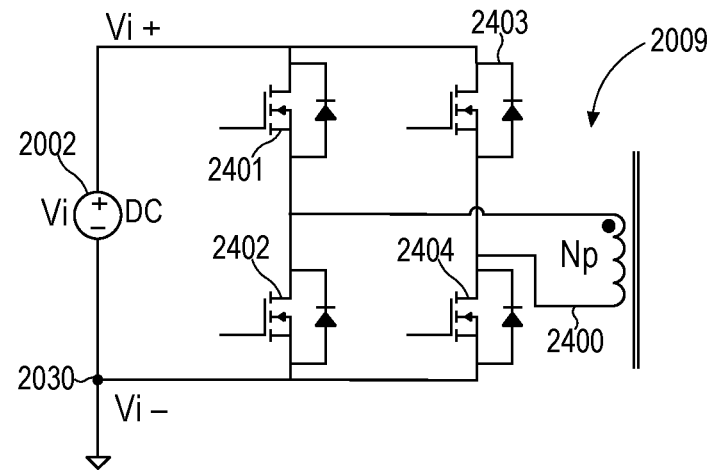
FIG. 24 is a circuit schematic of a full-bridge input inverter for the primary side of the IPOS type of isolated DC-to-DC converter, according to an example embodiment.

FIG. 24 is a circuit schematic of a full-bridge input inverter, according to an example embodiment. This inverter circuit 2011 may be implemented using two series pairs of transistors 2401, 2402 and 2403, 2404 coupled between Vi+ and Vi− (e.g., ground 2030). In an embodiment, the transistors are NFET transistors.

The common node between the first pair of transistors 2401, 2402 is coupled to one side of the primary winding 2400. The common point between the second pair of transistors 2403, 2404 is coupled to the other side of the primary winding 2400.

Figure 25:
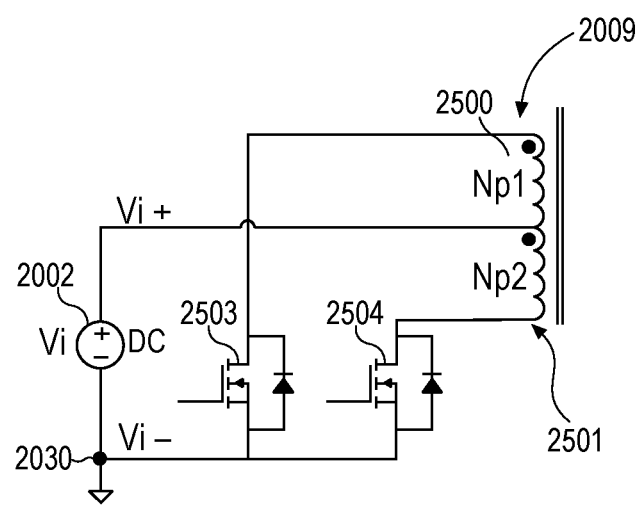
FIG. 25 is a circuit schematic of a push-pull input inverter for the primary side of the IPOS type of isolated DC-to-DC converter, according to an example embodiment.
Figure 26:
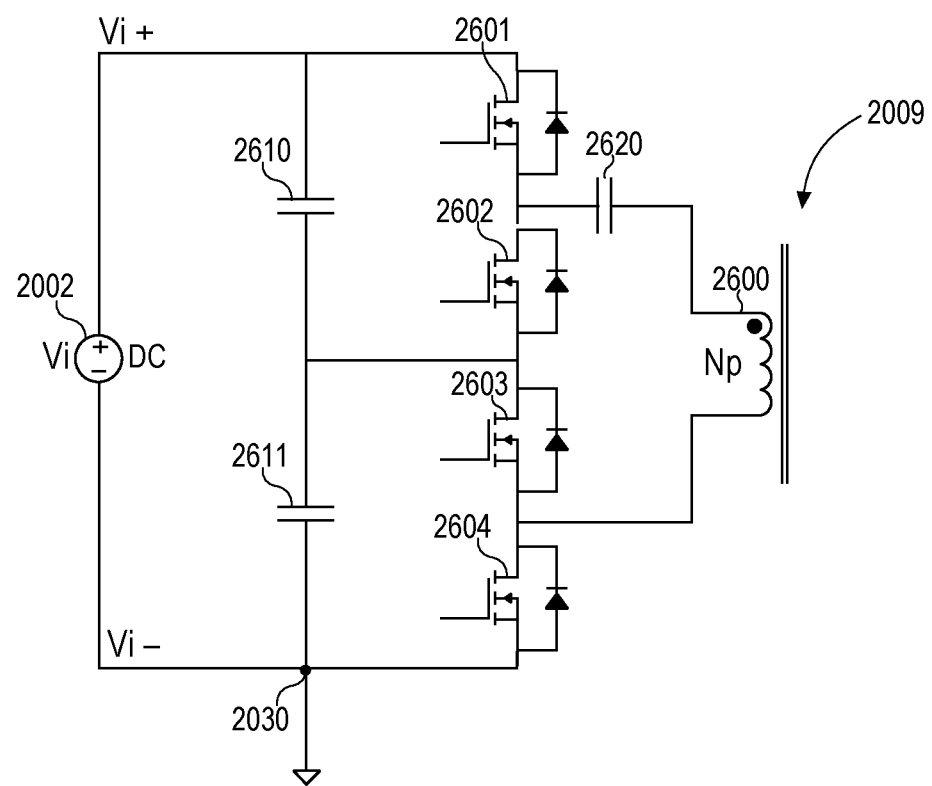
FIG. 26 is a circuit schematic of a three-level half-bridge input inverter for the primary side of the IPOS type of isolated DC-to-DC converter, according to an example embodiment.

FIG. 25 is a circuit schematic of a push-pull input inverter, according to an example embodiment. This inverter circuit 2011 may be implemented using a first transistor 2503 coupled between the Vi− input and the Np1 winding 2500. A second transistor 2504 is coupled between the Vi− input and the Np2 winding 2501. The Vi+ input is coupled to the both the Np1 and the Np2 windings 2500, 2501.

FIG. 26 is a circuit schematic of a three-level half-bridge input inverter, according to an example embodiment. This inverter circuit 2011 may be implemented using a series string of transistors 2601-2604 coupled between the Vi+ voltage and the Vi− voltage (e.g., ground 2030). A first capacitor is coupled in parallel with the top pair of transistors 2601, 2602. A second capacitor is coupled in parallel with the bottom pair of transistors 2603, 2604. A common node between the first pair of transistors 2601, 2602 is coupled to one side of the primary winding 2600. A common node between the second pair of transistors 2603, 2604 is coupled to the other side of the primary winding 2600. A capacitor 2620 is in series with the primary winding 2600.

Following are some discussions and comparisons about the ISOP and IPOS types of topologies described in the above-described embodiments.

Since the non-isolated, regulated DC-to-DC converter is in front of the non-regulated isolated resonant converter stage, the above-described ISOP-type topologies have good startup performance. The Vb1 and Vb2 voltages can be controlled to ramp up linearly by the non-isolated DC/DC converter. Thus, the non-regulated isolated resonant converter stage can power up smoothly without causing a significant in-rush current. But the output load transient response may be slower than the above-described IPOS-type topologies due to the delay caused by the non-regulated isolated resonant converter stage. In addition, the ISOP-type topologies are generally less susceptible to input voltage disturbances compared to the IPOS-type topologies.

When Vin=$Vin_{min}$ and Vo=$Vo_{max}$, the ISOP-type topologies result in the relatively improved efficiency. For Vin=$Vin_{max}$, Vo=$Vo_{min}$, the overall efficiency is generally lower.

The boost converter may generally be a better choice than a buck or a buck-boost converter to use in ISOP-type isolated partial power processing converters. Boost converters typically have higher efficiency when voltage boosting ratio is relatively small (i.e., duty cycle is small, or in other words, Vin=$Vin_{max}$, Vo=$Vo_{min}$) and the efficiency is lower when duty cycle is large or, in other words, Vin=$Vin_{min}$, Vo=$Vo_{max}$. Combining the efficiency characteristics of the boost converter and the ISOP-type isolated partial power processing converter, a boost-derived ISOP-type isolated partial power processing converter is able to achieve well balanced efficiency having relatively wide input and output voltage ranges.

Since the non-regulated isolated resonant converter stage of the IPOS-type isolated partial power processing converters is the first stage and directly connected to the input, the non-regulated isolated resonant converter stage may cause an inrush current during power up. However, since the non-isolated regulated DC-to-DC converter is at the output, this can make the converter respond faster to the output transients.

The above-described IPOS-type topologies are generally more susceptible to input voltage disturbances compared to the proposed ISOP-type topologies. When Vin=$Vin_{min}$, Vo=$Vo_{max}$, IPOS gives the lowest efficiency in general, while for Vin=$Vin_{max}$, Vo=$Vo_{min}$, the overall efficiency is better.

Buck converters may generally be a better choice than boost or buck-boost converter to use in IPOS-type isolated partial power processing converters. For the same reason for boost-derived ISOP-type isolated partial power processing converters, a buck-derived IPOS-type isolated partial power processing converter is also able to achieve well balanced efficiency in relatively wide input and output voltage ranges.

In the previous description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. An Input-Series-Output-Parallel (ISOP)-type power converter circuit comprising:
    a non-isolated, regulated DC-to-DC converter having a positive input coupled to a DC power source and a negative input connected to a negative output;
    a plurality of capacitors, comprising first and second capacitors, coupled in series between a positive output of the converter and a circuit ground, the negative output of the converter coupled to a common node of the first and second capacitors;
    a half-bridge inverter network comprising first and second half-bridge inverters coupled between the positive output and a circuit ground, each inverter having an input respectively coupled to the first capacitor and the second capacitor;
    a plurality of resonant tanks, each resonant tank coupled to an output of a respective one of the first and second half-bridge inverters;
    a transformer having at least one primary winding coupled to outputs of the plurality of resonant tanks; and
    a rectifier circuit, coupled to a secondary winding of the transformer, to provide a DC output voltage.

2. The ISOP-type power converter circuit of claim 1, wherein the plurality of resonant tanks comprise a first resonant tank circuit coupled between the first half bridge inverter and the transformer and a second resonant tank circuit coupled between the second half bridge inverter and the transformer.

3. The ISOP-type power converter circuit of claim 2, further comprising a third resonant tank circuit coupled between the half-bridge inverter network and the transformer.

4. The ISOP-type power converter circuit of claim 2, wherein the transformer comprises one primary winding and the first and second resonant tank circuits each comprise a respective capacitor and inductor coupled in series wherein the first resonant tank circuit is coupled to the first half-bridge inverter and the primary winding and the second resonant tank circuit is coupled to the second half-bridge inverter and the primary winding.

5. The ISOP-type power converter circuit of claim 2, wherein the transformer comprises a first primary winding and a second primary winding and the first and second resonant tank circuits each comprise a respective capacitor and inductor coupled in series wherein the capacitor of the first resonant tank circuit is coupled to the first half-bridge inverter and the capacitor of the second resonant tank circuit is coupled to the second half-bridge inverter, the inductor of the first resonant tank circuit is coupled to the first primary winding and the inductor of the second resonant tank circuit is coupled to the first and the second primary windings.

6. The ISOP-type power converter circuit of claim 2, wherein the first and second resonant tank circuits each comprise a respective capacitor and inductor coupled in series wherein the capacitor of the first resonant tank circuit is coupled to the first half-bridge inverter and the inductor of the first resonant tank circuit is coupled to the transformer and the capacitor of the second resonant tank circuit is coupled to the negative output of the DC-to-DC converter and the inductor of the second resonant tank circuit is coupled to the transformer.

7. The ISOP-type power converter circuit of claim 2, wherein the first and second resonant tank circuits each comprise a respective capacitor and inductor coupled in series wherein the capacitor of the first resonant tank circuit is coupled to the negative output of the DC-to-DC converter and the inductor of the first resonant tank circuit is coupled to the transformer and the capacitor of the second resonant tank circuit is coupled to the second half-bridge inverter and the inductor of the second resonant tank circuit is coupled to the transformer.

8. The ISOP-type power converter circuit of claim 2, wherein the first half-bridge inverter is coupled between the positive output of the DC-to-DC converter and the circuit ground and the second half-bridge inverter is coupled between the negative output of the DC-to-DC converter and the circuit ground, further wherein the first resonant tank circuit is coupled between the first half-bridge inverter and the transformer, the second resonant tank circuit is coupled between the second half-bridge inverter and the transformer, and the circuit ground is coupled to the transformer.

9. The ISOP-type power converter circuit of claim 8, wherein the transformer comprises first and second primary windings and the second resonant tank circuit is coupled to both the first and second primary windings, the first resonant tank circuit is coupled to the first primary winding, and the circuit ground is coupled to the second primary winding.

10. The ISOP-type power converter circuit of claim 3, wherein the third resonant tank circuit is coupled between the negative output of the DC-to-DC converter and the transformer.

11. The ISOP-type power converter circuit of claim 1, wherein the rectifier circuit comprises a full-bridge rectifier coupled to the secondary winding of the transformer.

12. The ISOP-type power converter circuit of claim 1, wherein the rectifier circuit comprises a center-tapped full-wave rectifier coupled to first and second secondary windings of the transformer.

13. The ISOP-type power converter circuit of claim 1, wherein the rectifier circuit comprises a three-level half-bridge rectifier coupled to the secondary winding of the transformer.

14. The ISOP-type power converter circuit of claim 1, wherein the non-isolated, DC-to-DC converter is one of a buck converter, a boost converter, a buck-boost converter, or any non-inverting DC-DC converter.

15. An Input-Parallel-Output-Series (IPOS)-type power converter circuit comprising:
    an inverter circuit coupled to a DC power source to generate an AC voltage;
    a transformer having a primary winding coupled to an inverter output;
    a resonant tank network coupled to secondary windings of the transformer;

a half-bridge rectifier network, comprising first and second half bridges coupled in series, coupled to the resonant tank network;

a capacitor network comprising first and second capacitors coupled in series, the capacitor network coupled to an output of the half-bridge rectifier network and a common circuit node; and a non-isolated, regulated DC-to-DC converter to provide an output voltage, the converter comprising a positive input and a negative input respectively coupled to opposite ends of the first capacitor and the first half bridge rectifier, wherein a positive output is coupled to the output voltage, further wherein a negative output of the converter is connected to a common node of the negative input, the second capacitor, the first capacitor, and the half-bridge rectifier network.

16. The IPOS-type power converter circuit of claim 15, wherein the inverter circuit comprises one of a full-bridge inverter or a half-bridge inverter.

17. A method for operation of an Input-Series-Output-Parallel (ISOP)-type power converter circuit, the method comprising:

generating a DC power supply voltage;

generating regulated DC voltages from the power supply voltage with a non-isolated, DC-to-DC converter having a negative input connected to a negative output;

converting the regulated DC voltages to first AC voltages with half-bridge inverters;

filtering the first AC voltages with a resonant tank network to generate filtered AC voltages;

generating second AC voltages, from the filtered AC voltages, through a transformer; and generating a DC output voltage from the second AC voltages.

18. The method of claim 17, wherein filtering the first AC voltages comprises filtering the first AC voltages with three resonant tank circuits.

19. A method for operation of an Input-Parallel-Output-Series (IPOS)-type power converter circuit, the method comprising:

generating a DC power supply voltage;

generating a primary AC voltage from the power supply voltage to be coupled to a primary winding of a transformer;

generating a plurality of secondary AC voltages from secondary windings of the transformer;

filtering the plurality of secondary AC voltages to generate a plurality of filtered AC voltages;

converting the plurality of filtered AC voltages to a plurality of DC voltages with half-bridge inverters; and converting the plurality of DC voltages to an output voltage from a positive output of an isolated, regulated DC-to-DC converter having a negative input connected to a negative output.

20. The method of claim 19, wherein generating the plurality of secondary AC voltages comprises generating the plurality of secondary AC voltages from a plurality of secondary windings of the transformer.

* * * * *